(12) United States Patent
Beitchman et al.

(10) Patent No.: US 10,936,589 B1
(45) Date of Patent: Mar. 2, 2021

(54) CAPABILITY-BASED QUERY PLANNING FOR HETEROGENOUS PROCESSING NODES

(71) Applicant: Amazon Technologies, Inc., Seattle, WA (US)

(72) Inventors: Marc Howard Beitchman, Seattle, WA (US); Andrew Edward Caldwell, Santa Clara, CA (US); Adam S. Hartman, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/705,140

(22) Filed: Sep. 14, 2017

(51) Int. Cl.
*G06F 16/24* (2019.01)
*G06F 16/2453* (2019.01)
*G06F 16/27* (2019.01)

(52) U.S. Cl.
CPC ........ *G06F 16/24542* (2019.01); *G06F 16/27* (2019.01)

(58) Field of Classification Search
CPC .............................................. G06F 16/24524
USPC ....................................................... 707/718
See application file for complete search history.

(56) References Cited

U.S. PATENT DOCUMENTS

| | | | |
|---|---|---|---|
| 5,588,150 A | 12/1996 | Lin et al. | |
| 7,010,521 B2 | 3/2006 | Hinshaw et al. | |
| 7,433,863 B2 | 10/2008 | Zane et al. | |
| 8,402,469 B2 | 3/2013 | Bose et al. | |
| 9,690,829 B2 | 6/2017 | Tian | |
| 9,723,054 B2* | 8/2017 | Petculescu | ............ H04L 67/02 |
| 2015/0134795 A1* | 5/2015 | Theimer | ............ G06F 16/254 709/223 |
| 2015/0178277 A1* | 6/2015 | Singhal | ............ G06F 16/24552 706/20 |
| 2015/0248461 A1* | 9/2015 | Theeten | ............ G06F 16/24568 707/718 |
| 2015/0248462 A1* | 9/2015 | Theeten | ............ G06F 16/24568 707/688 |
| 2016/0350375 A1* | 12/2016 | Das | ............ G06F 16/24542 |
| 2017/0285965 A1* | 10/2017 | Finlay | ............ G06F 3/0608 |
| 2018/0329956 A1* | 11/2018 | Mittal | ............ G06F 9/44505 |
| 2018/0357107 A1* | 12/2018 | Devireddy | ............ G06F 9/5077 |

* cited by examiner

*Primary Examiner* — Baoquoc N To
(74) *Attorney, Agent, or Firm* — Robert C. Kowert; Kowert, Hood, Munyon, Rankin & Goetzel, P.C.

(57) ABSTRACT

The capabilities of individual nodes that process a query may be evaluated to perform query planning. An operation of a plan to perform a query can be identified for assignment to a node based on the capabilities of nodes to perform the query operation. A node may be selected based on the difference between the selected node's capability to perform the query operation and other nodes capabilities to perform the operation. Capability-based selection can be performed at runtime, in some embodiments, in order to make query operation assignments based on further information obtained as a result of performing prior operations in the query.

20 Claims, 11 Drawing Sheets

CAPABILITY-BASED QUERY PLANNING FOR HETEROGENOUS PROCESSING NODES

BACKGROUND

Computing resources or nodes working together to perform distributed processing of a query as a cluster can be utilized to query large data sets in a performant manner. For instance, a computing cluster can have many nodes that together implement a distributed query framework for performing distributed querying of a large data set. While the combined capabilities of the nodes of the cluster can be applied to provide adequate performance of queries in some scenarios, further improvements may be obtained by optimizing the performance of individual operations included in the performance of a query that may not be able to leverage the combined capabilities of the cluster, but may instead depend upon the capability of an individual node. Techniques that can leverage the individual capabilities of nodes in a cluster to further optimize the performance of individual query operations may thus be desirable.

Figure 1:
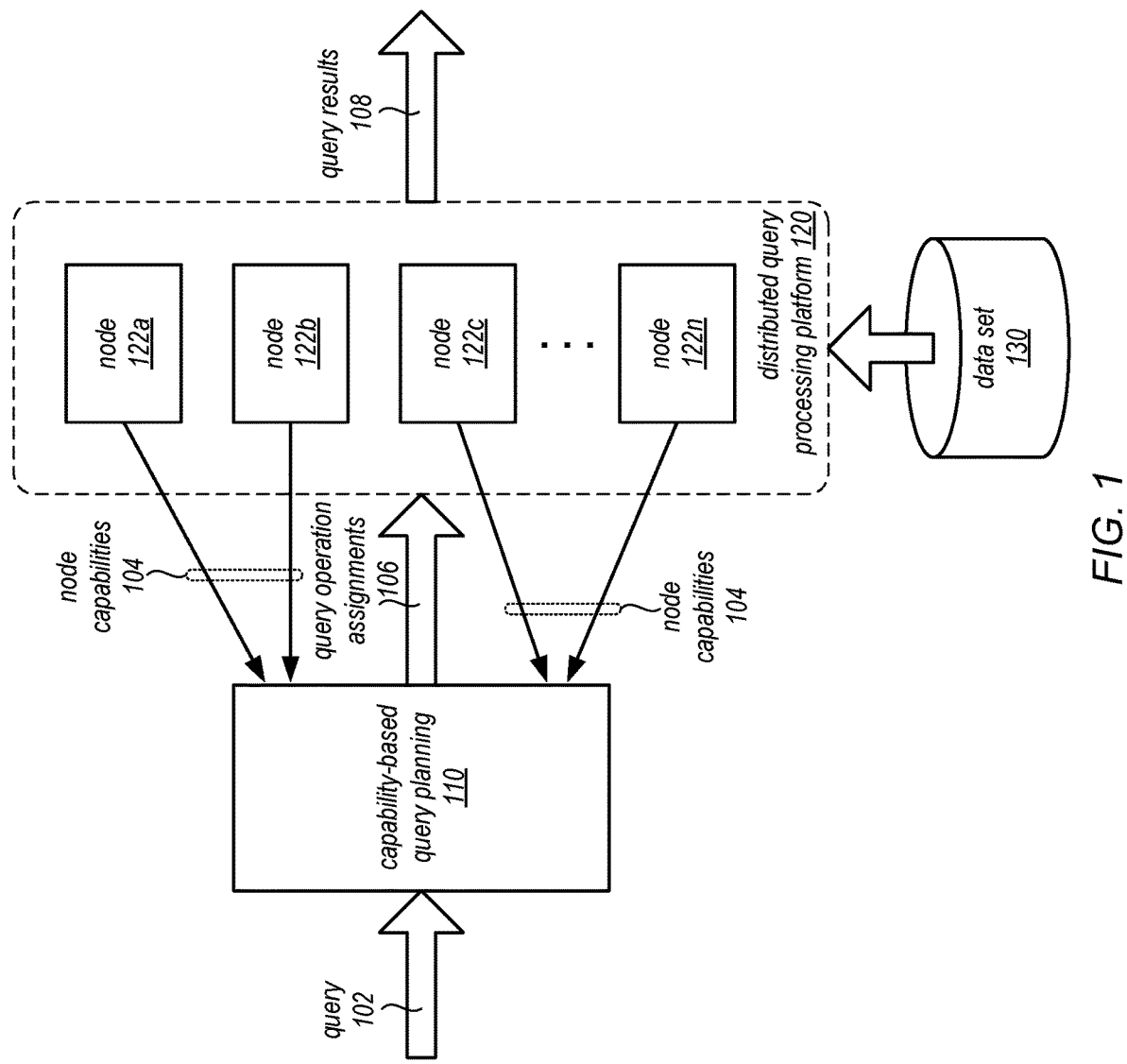
FIG. 1 illustrates a logical block diagram of capability-based query planning for heterogeneous processing nodes, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of capability-based query planning for heterogeneous processing nodes are described herein. Query planning may be performed in various embodiments to determine a plan that can include the number, type, arrangement, assignments, and/or ordering of operations to perform a query. Query planning may also improve the performance of a query with respect to modifications, changes, or other selections made with respect to the plan, in some embodiments. For example, a cost-based optimization to a query plan that optimizes performance time may compare the time costs of different possible query plans to select the query plan that minimizes the performance time of a query, in one embodiment. Other features, such as balancing the distribution of work (e.g., across a distributed processing cluster) or minimizing the network bandwidth or storage bandwidth consumed may be similarly optimized, in some embodiments.

In some embodiments, collections, sets, clusters, or other groupings of processing nodes may be heterogeneous, including nodes with different performance capabilities (which may be depend upon different hardware and/or software resources available to a node). Nodes may be individual computing systems, servers, or other components (e.g., computing system 2000 in FIG. 11 below) or may be virtualized systems or applications (e.g., virtual machines, droplets, containers, etc.). In such embodiments, query planning may further optimize the performance of a query by accounting for the different capabilities of the processing nodes in a cluster. For example, query operations that utilize a type of resource (e.g., memory, I/O bandwidth, computing capacity, specialized/optimized hardware, such as a Field Programmable Gate Array (FPGA), may be assigned to a processing node that has greater capacities or other capabilities of the type of resource. Capability-based query planning may leverage both the combined capabilities offered by distributed query processing (e.g., using multiple nodes in a cluster) and the individual capabilities of nodes so that an operation that could be performed faster or otherwise more optimally by one of the nodes is assigned to that node, in some embodiments.

FIG. 1 illustrates a logical block diagram of capability-based query planning for heterogeneous processing nodes, according to some embodiments. Capability-based query planning 110 may be implemented to make query operation assignments 106 as part of a plan to perform a query 102 (e.g., a request formatted according to a query language, such as structured query language (SQL), or other programmatic interface (an API) that may allow a user to identify conditions, criteria, or results to obtain/achieve by performing a query) directed to data set 130 (e.g. various kinds of structured or unstructured data which may be queried using a distributed query processing platform) based on the capabilities 104 of nodes, such as nodes 122a, 122b, 122c, and 122n, (which may be different in one or more types, capacities, or other capabilities such that nodes 122 form a heterogeneous group of nodes) of a distributed query processing platform 120 (e.g., cluster-based query processing or other data processing platforms that implement a cluster or group of distributed processing resources), in order to perform query 102 and provide results of the query 108, in some embodiments. Capability-based query planning 110 may be implemented as part of a query engine or other component that generates and/or optimizes a plan to perform a query, in some embodiments. For example, a leader node as discussed below with regard to FIG. 6, or a separate planning service or component as part of or separate from managed query service 270 discussed below with regard to FIGS. 2-7. Although capability-based query planning 110 is illustrated as separate from distributed query processing platform 120, in at least some embodiments, capability-based query planning 110 may be implemented as part of distributed query processing platform 120 on one or more of nodes 122.

Capability-based query planning 110 may receive the capabilities 104 of nodes prior to receipt of a query (or in some embodiments in response to the receipt of query 102). Capabilities may indicate the various resources available for performing a query operation at nodes 122. For example, if a node, such as node 122a, is hosted on a server or other computing system that offers a specialized hardware device (e.g., an Application Specific Integrated Circuit (ASIC) or FPGA) for performing certain operations, sorting, filtering, regular expression searches, aggregations, then the hardware device and/or hardware optimized operations may be identified to capability-based query planning 110. Other resources, such as increased memory, storage capacity, I/O bandwidth, network bandwidth, or graphics processing units (GPUs), or different types or versions of software applications that are installed and executing to aid in the performance of a query operation.

Capability-based query planning 110 may determine a number, type, and/or arrangement of operations to perform a query, such as read/scan operations, write operations, expression evaluation or other function operations, filter operations, sort operations, aggregate operations, limit operations, join operations, and so on. Capability-based query planning 110 may implement a lookup table or other mapping information that weights, links, or associates query operations with different types or capabilities (e.g., either specifically desired capabilities, such as at least X amount of memory, or hardware-optimized sorting). Then assignments of the different operations to different nodes in distributed query processing platform may be made. For example, the differences between the nodes 122 of desired resources or other capabilities to perform a query operation may be evaluated in order to select the node (or multiple nodes) with the most optimal capability to perform the query operation (e.g., selecting the node with greatest memory, existence of a GPU when other nodes do not have a GPU, etc.). The assignments of query operations 106 may be provided or otherwise performed at the assigned nodes 122 when the plan for the query is performed, in various embodiments.

Please note that the previous description of capability-based query planning for heterogeneous processing nodes is a logical illustration and thus is not to be construed as limiting as to the implementation of nodes, a distributed query processing platform, data set or component, system, or device implementing capability-based query planning.

This specification begins with a general description of a provider network that implements a managed query service which may utilize heterogeneous clusters of computing resources, such as nodes, and may implement capability-based query planning for the heterogeneous clusters. Then various examples of the managed query service (along with other services that may be utilized or implemented) including different components/modules, or arrangements of components/module that may be employed as part of implementing the services are discussed. A number of different methods and techniques to implement capability-based query planning for heterogeneous processing nodes are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
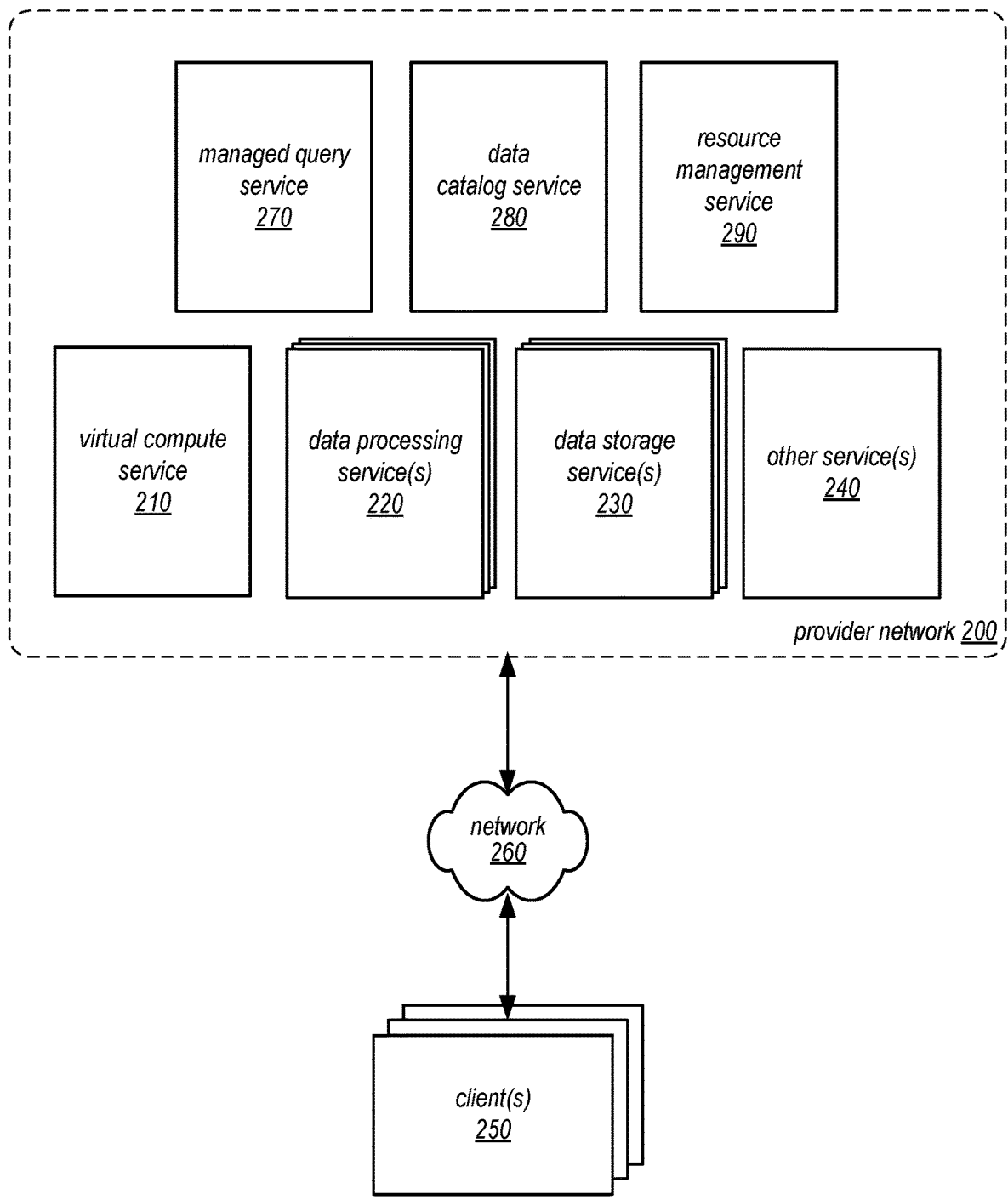
FIG. 2 is a logical block diagram illustrating a provider network offering a managed query service that implements capability-based query planning for a cluster of heterogeneous processing nodes to perform queries, according to some embodiments.

FIG. 2 is a logical block diagram illustrating a provider network offering a managed query service that implements capability-based query planning for a cluster of heterogeneous processing nodes to perform queries, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, FPGAS, ASICS, GPUS, as well as any other performance characteristic, which may offer different capabilities for performing query operations, as discussed below with regard to FIGS. 5-10. Configurations of compute instances may also include their location, in a particular data center, availability zone, geographic, location, etc. . . . and (in the case of reserved compute instances) reservation term length. Different configurations of compute instances, as discussed below with regard to FIGS. 3 and 7, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-6. Data catalog service 280 may, in various embodiments collect, determine, maintain, obtain or otherwise store statistics on data sets, such as number of rows in a data object (e.g., table), number of storage units (e.g., blocks) for a data object, average size of data within the data object (e.g., row length), data distribution (e.g., histograms), data selectivity or density, and so on.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A data storage service 230 may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-7, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf the different services. Queries may be received that are directed to one service (e.g., managed query service 270) or to data stored or accessed by multiple services (e.g., processing services 220 and/or data storage service(s) 230), in some embodiments.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in one or more of data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
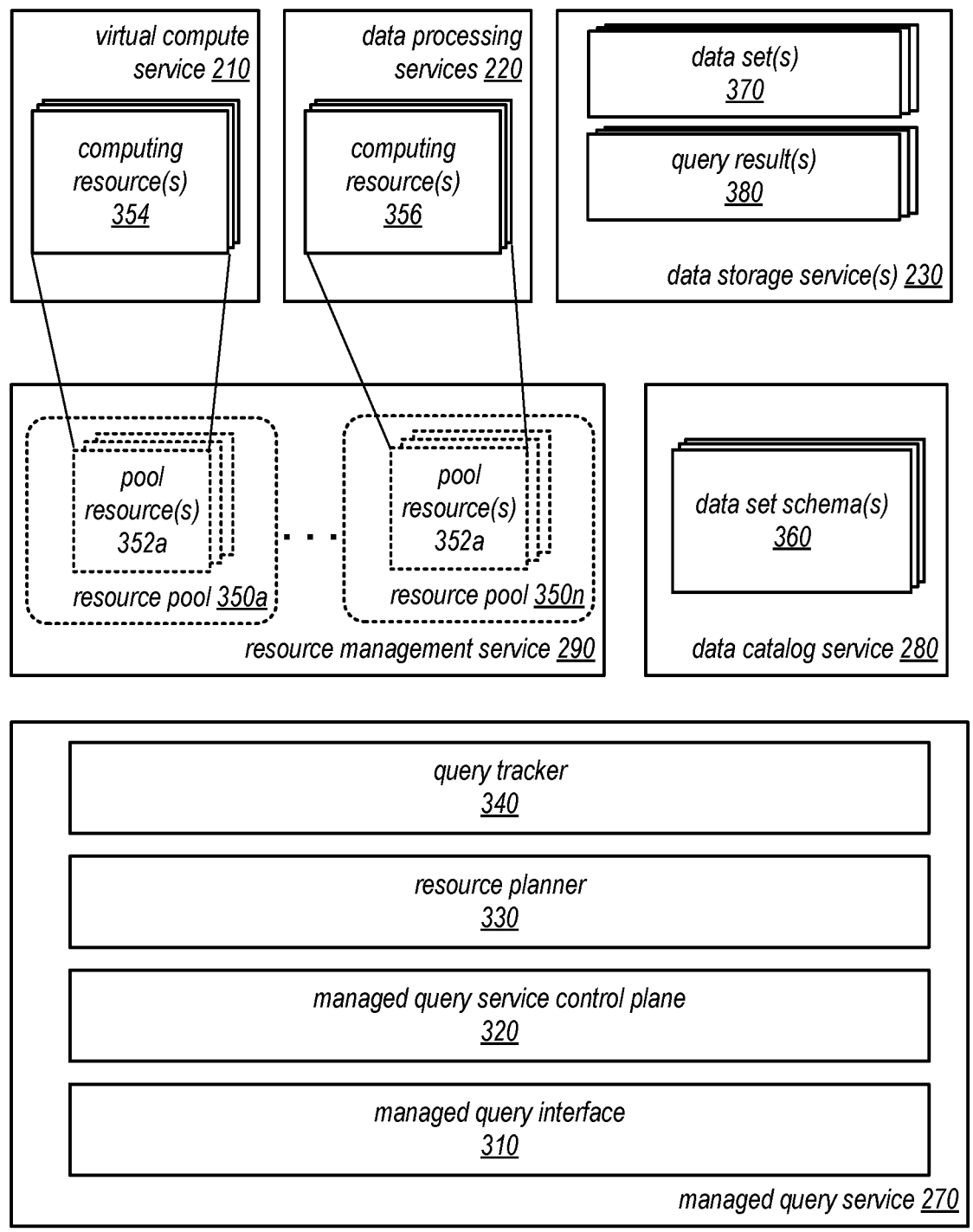
FIG. 3 is a logical block diagram illustrating a managed query service, according to some embodiments.

FIG. 3 is a logical block diagram illustrating a managed query service, according to some embodiments. As discussed below with regard to FIGS. 4-7, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-6, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIG. 5. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). In at least some embodiments, resource planner 330 may determine the composition or makeup of capabilities offered by a cluster of heterogeneous resources in order to provide a configuration of a cluster that offers different capabilities to perform capability-based query planning for heterogeneous processing nodes. In some embodiments, machine learning techniques may be applied by resource planner 330 to generate a query estimation model that can be applied to the features of a received query to determine the number/configuration of resources in a cluster, in one embodiment. For example, supervised learning techniques may classify queries with respect to different combinations of one or more resource types that are used to achieve different performance results for prior queries, such as FPGA operation implementations vs CPU operation implementations, memory allocation, I/O bandwidth, or other resources implemented to perform a query (and which may differ in a heterogeneous cluster), in some embodiments. In another example embodiment, regression analysis or other curve fitting techniques may identify cluster membership of different types of nodes or capabilities. Features selection and feature extraction techniques may be applied to identify which query features should be mapped to which resource capabilities, in some embodiments. Please note that the previous machine learning examples are not intended to be limiting but merely provide examples of the application of machine learning techniques to determine resource capabilities that may be identified for performing query operations on nodes. Resource planner 330 may then provide or identify which ones of the nodes are available to execute the query from a pool that may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-6).

Figure 4:
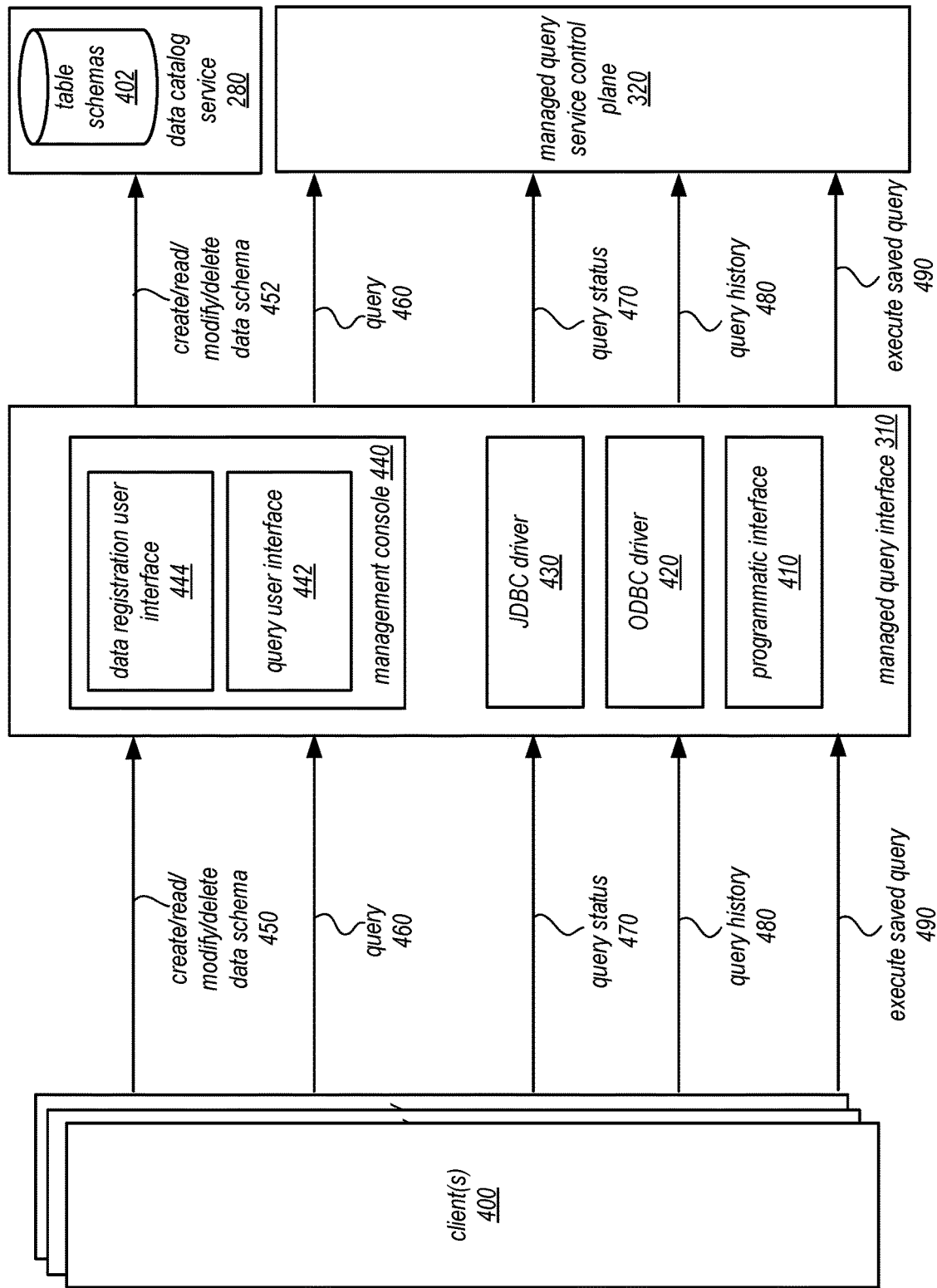
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 5. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request 490 may include a pointer or other identifier to a query stored or saved for a particular user account or client. Managed query service control plane 320 may then access that user query store to retrieve and execute the query (according to techniques discussed below with regard to FIG. 5).

Figure 5:
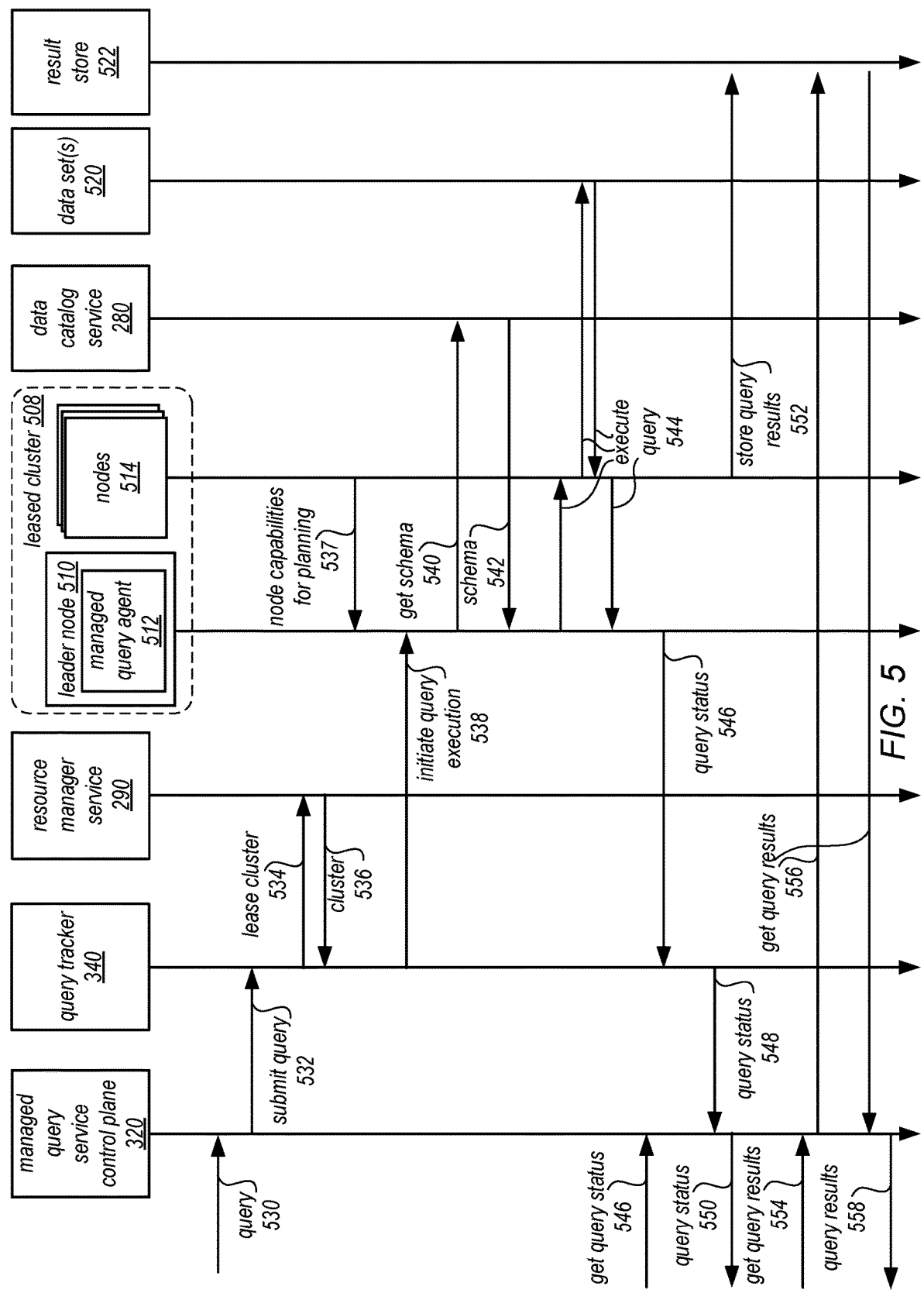
FIG. 5 is a sequence diagram for managed execution of queries utilizing capability-based query planning, according to some embodiments.

FIG. 5 is a sequence diagram for managed execution of queries, according to some embodiments. Query 530 may be received at managed query service control plane 320 which may submit the query 532 to query tracker 340 indicating the selected cluster 536 for execution. Query tracker 340 may lease 534 a cluster 508 from resource management service 290, which may return 536 a cluster 508. Resource management service 290 and query tracker 340 may maintain lease state information for resources that are leased by query tracker and assigned to execute received queries. Leader node 510 of leased cluster 508 may receive capabilities 537 of nodes 514 of cluster 508, in some embodiments. For example, a cluster provisioning workflow may register or otherwise have nodes 514 report capabilities 537 automatically. In some embodiments, leader node 510 (or managed query agent 512) may request the capabilities of nodes for planning 537. Query tracker 340 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542 (e.g., implementing a technique to apply schema for processing queries "on-read"). Provisioned cluster 508 can then generate a plan to execute or otherwise perform query 530, make assignments of operations in the query plan based on the obtained node capabilities 537, and execute the query 544 with respect to data set(s) 520 (e.g., by having leader node 510 send one or more instructions to nodes 514 which may access data sets 520, as discussed in detail below with regard to FIG. 6) according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive a request to get a query results 554 and get query results 556 from results store 522 and provide the query results 558 in response, in some embodiments.

Figure 6:
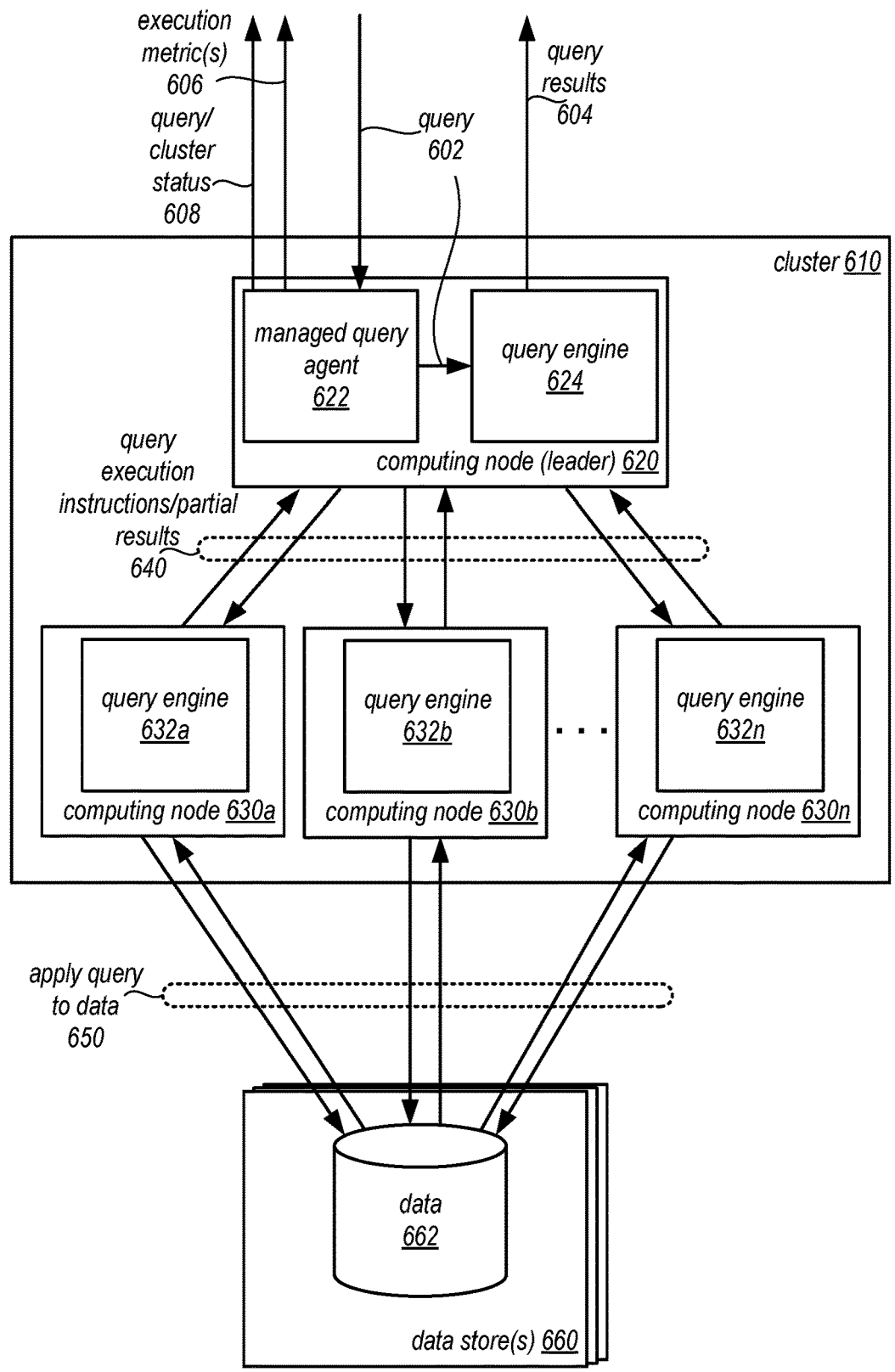
FIG. 6 is a logical block diagram illustrating a heterogeneous cluster processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. Computing resources with different capabilities, whether hardware and/or software implemented may be included to implement a heterogeneous cluster (as opposed to a homogenous cluster where the individual capabilities of the nodes in the cluster are the same). FIG. 6 is a logical block diagram illustrating a heterogeneous cluster processing a query as part of managed query execution, according to some embodiments. Cluster 610 may implement a computing node 620 that is a leader node (according to the query engine 624 implemented by cluster 610). In some embodiments, no single node may be a leader node, or the leader node may rotate from processing one query to the next.

Managed query agent 622 may be implemented as part of leader node 620 in order to provide an interface between the provisioned resource, cluster 610, and other components of managed query service 270, resource management service 290, and query optimization service 292. For example, managed query agent 622 may provide further data to managed query service 270, such as the status 608 of the query (e.g. executing, performing I/O, performing aggregation, etc.,) and execution metrics 606 (e.g., health metrics, resource utilization metrics, cost metrics, length of time, etc.). In some embodiments, managed query agent 622 may provide cluster/query status 608 and execution metric(s) 606 to resource management service 290 (in order to make pool management decisions, such as modification events, lease requests, etc.). For example, managed query agent 622 may indicate cluster status 608 to resource management service 290 indicating that a query has completed and that the cluster 610 is ready for reassignment (or other resource lifecycle operations). In some embodiments, query/cluster status 608 may indicate that an individual node 630 of cluster 610 may be released or returned, as discussed in detail below with regard to FIG. 10.

Leader node 620 may implement query engine 624 to execute queries according to a query plan for query 602. For example, query engine 624 may perform various techniques to parse a query, determine the number, type and arrangement of operations in a plan to perform query 602. Query engine 624 may determine which of computing nodes 630 should be assigned operations in the plan based on the differences in the capabilities of the nodes to perform the operations, as discussed in detail below with regard to FIGS. 8 and 9. Query engine 624 may execute or otherwise perform the query plan. For example, leader node 622 may send query execution instructions 640 to computing nodes that access and apply the query to data 662 in data store(s) 660 according to the plan. Compute nodes, such as nodes 630a, 630b, and 630n, may respectively implement query engines 632a, 632b, and 632n to execute the query instructions, apply the query to the data 650, and return partial results 640 to leader node 620, which in turn may generate and send query results 604. In some embodiments, query planning and operation assignment to computing nodes 630 may be dependent upon the results of prior operations or stages. For example, an operation may be memory intensive dependent upon the amount of data returned in an earlier performed operation. If the amount of returned data exceeds some threshold, then the assignment of the operation to a node 630 with greater memory capacity may be made. If the amount of data does not exceed the threshold, then the assignment may be made based on which node 630 is available to perform new work, in some embodiments. In this way, capability based assignments may be performed dynamically, at runtime when the plan is being performed and may adapt to changing circumstances or unexpected results. Thus, some assignments may be made or specified in the alternative depending on the results of prior stages or operations of a plan. In other embodiments, other criteria, such as whether a node that may be assigned an operation is still live or available to perform the operation, in some embodiments. For example, a condition to be satisfied prior to assignment of an operation may be a check that the intended node is still responsive to heartbeat or other liveness detection communications before assigning and sending a request to perform an operation to the node.

Query engine 624 and query engines 632 may implement various kinds of distributed query or data processing frameworks, such as the open source Presto distributed query framework or the Apache Spark framework. In some embodiments, the version or configuration of query engines 632 may vary depending upon the differences of the nodes 630. For example, nodes 630 that implement hardware components with FPGAs configured to perform one or multiple hardware optimized query operations may implement a version of query engine 632 that directs the performance of that operation to the FPGA (as opposed to executing instructions in a CPU) or GPU. In some embodiments, a configuration of the query engine 632 may be changed (e.g., to increase buffer or other memory allocation sizes, request rates via an I/O or network channel, etc.) based on the different capabilities of the node 630.

Figure 7:
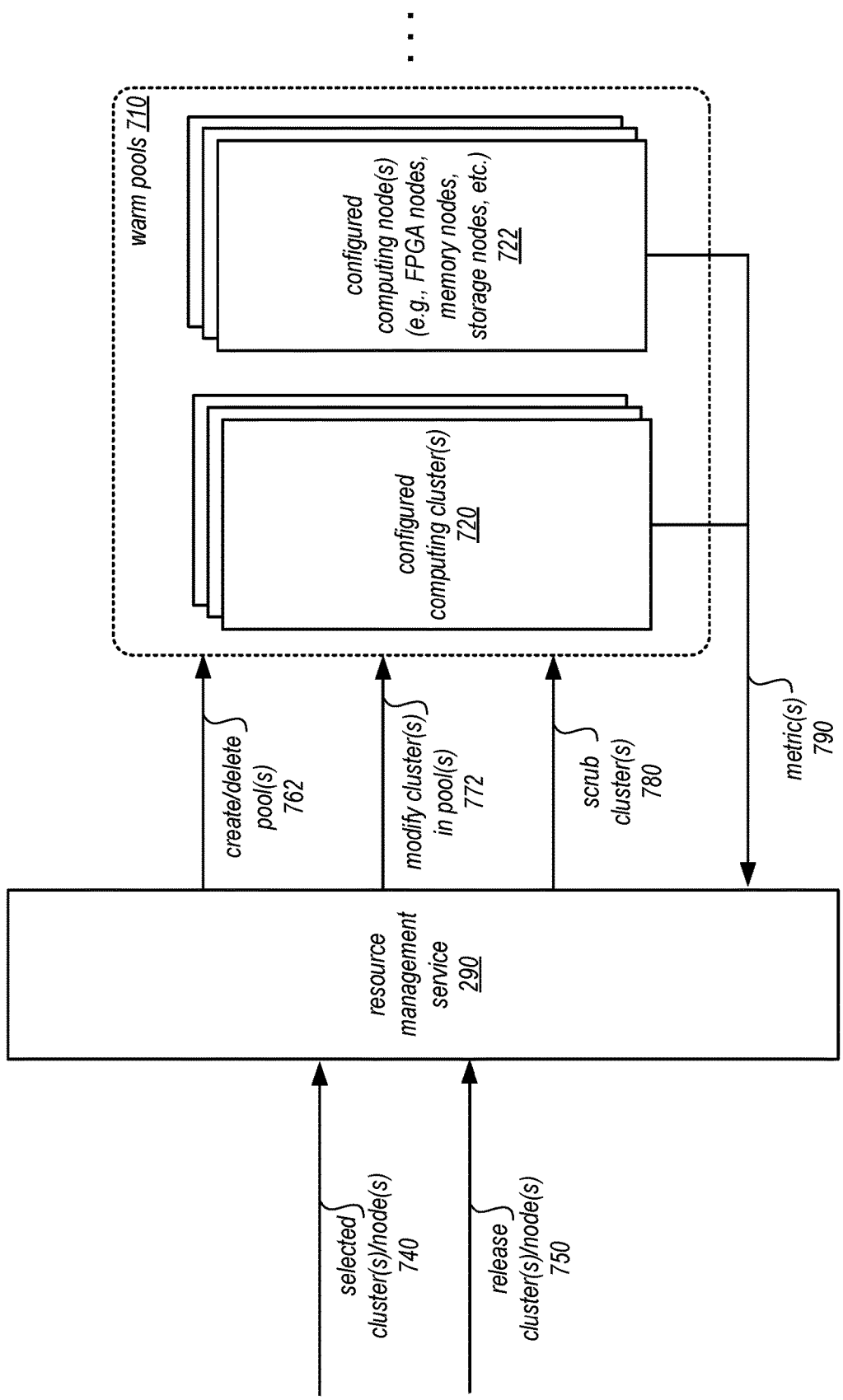
FIG. 7 is logical block diagram illustrating interactions between a resource management service and pools of resources configured clusters and heterogeneous computing nodes, according to some embodiments.

FIG. 7 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for available clusters/or nodes 730 (as may be identified according to the techniques discussed below with regard to FIG. 10) may be received (e.g., from resource planner 330) in order to provide a snapshot or other state of configured computing cluster(s) 720 or configured computing node(s) 722 in one or more different warm cluster pools 710. Query tracker may send an indication that identifies the selected cluster/node 740 (e.g., by specifying a location, identifier, or other information for the identified computing resource) so that resource manager service 290 may remove the resource from the pool of available resource. For example, resource management service 290 may update state information for the cluster/node to indicate that the cluster/node is leased or otherwise unavailable. Resource management service 290 may also receive requests to release a cluster/node 750 from a current assignment (e.g., as the query execution at the cluster is complete or assigned operations at the node are complete). Resource management service 290 may then update state information (e.g., the lease) for the cluster and pool to return the cluster to the pool, in some embodiments.

As indicated at 762, resource management service 290 may automatically (or in response to requests (not illustrated)), commission or decommission pool(s) of clusters 710. For example in some embodiments, resource management service 290 may perform techniques that select the number and size of computing clusters 720 or type, configuration, resources of nodes 722 for the warm cluster pools 710. The number and size of the computing clusters 720 or number, type, or configuration of nodes 722 in one warm cluster pools 710 can be determined based upon a variety of factors including, but not limited to, historical and/or expected volumes of query requests, the price of the computing resources utilized to implement the computing clusters 720 or nodes 722, and/or other factors or considerations, in some embodiments.

Once the number and size of computing clusters or type/configuration/resources or nodes 722 has been determined, the computing clusters 720 or nodes 722 may be instantiated, such as through the use of an on-demand computing service, or virtual compute service or data processing service as discussed above in FIG. 2. The instantiated computing clusters/nodes can then be configured to process queries prior to receiving the queries at the managed query service. For example, and without limitation, one or more distributed query frameworks or other query processing engines can be installed on the computing nodes in each of the computing clusters 720. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 720 or node 722. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 720 or nodes 722.

Instantiated and configured computing clusters 720 or nodes 722 that are available for use by the managed query service 270 are added to the warm pools 710, in some embodiments. A determination can be made as to whether the number or size of the computing clusters 720 or nodes 722 in the warm cluster pools needs to be adjusted, in various embodiments. The performance of the computing clusters 720 or nodes 722 in the warm pools 710 can be monitored based on metric(s) 790 received from the pools 710. The number of computing clusters 720 or nodes 722 assigned to the warm pools 710 and the size of each computing cluster 720 (i.e. the number of host computers in each computing cluster 720) or nodes 722 in the warm pools 710 can then be adjusted. Such techniques can be repeatedly performed in order to continually optimize the number, size, configuration, or type of computing clusters 720 or nodes 722 in warm pools 710. Configurations of clusters or nodes for a resource pool or a new pool may be provided as provisioning recommendations (as discussed above with regard to FIG. 6), which may indicate the configuration of a cluster or node (e.g. query engine type, query engine configuration settings)

As indicated at 780, in some embodiments, resource management service 270 may scrub 780 clusters(s) or nodes, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 720 or node 722 is inactive (e.g. the computing cluster 720 has not received a query in a predetermined amount of time). If resource management service 290 determines that the computing cluster 720 or node 722 is inactive, then the computing cluster 720 or node 722 may be disassociated from the submitter of the query. The computing cluster 720 or node 722 may then be "scrubbed," such as by removing data associated with the submitter of the queries from memory (e.g. main memory or a cache) or mass storage device (e.g. disk or solid state storage device) utilized by the host computers in the computing cluster 720 or node 722. The computing cluster 720 or node 722 may then be returned to the appropriate one of warm pools 710 for use in processing other queries. In some embodiments, some clusters or nodes that are inactive might not be disassociated from certain users in certain scenarios. In these scenarios, the user may have a dedicated warm pool 710 of clusters or nodes available for their use.

Figure 8:
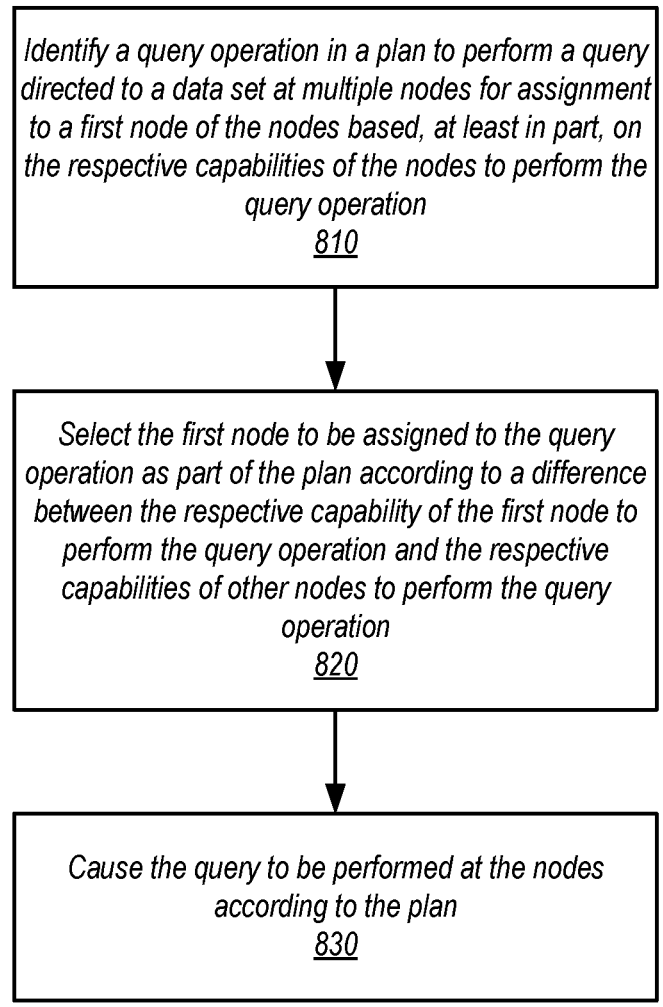
FIG. 8 is a high-level flowchart illustrating various methods and techniques to implement capability-based query planning for heterogeneous processing nodes, according to some embodiments.

Although FIGS. 2-7 have been described and illustrated in the context of a provider network leveraging multiple different services to perform queries using a query optimization service, the various components illustrated and described in FIGS. 2-7 may be easily applied to other systems, or devices that optimize the performance of query plans according to different capabilities of nodes that are provisioned or obtained to perform the query plan. As such, FIGS. 2-7 are not intended to be limiting as to other embodiments of a system that may implement capability-based query planning for heterogeneous processing nodes. FIG. 8 is a high-level flowchart illustrating various methods and techniques to implement capability-based query planning for heterogeneous processing nodes, according to some embodiments. Various different systems and devices may implement the various methods and techniques described below, either singly or working together. For example, a leader node or other component of a managed query service as described above with regard to FIGS. 2-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, a query operation in a plan to perform a query directed to a data set at multiple nodes may be identified for assignment to a first node of the nodes based, at least in part, on the respective capabilities to perform the query operation, in some embodiments. Query operation identification may utilize mapping or other information to recognize operations that may be optimized using an assignment to a node that maximizes or optimizes the potential performance that query operation based on the capability of that node to perform the query operation. For example, the operations in a parse tree or other query plan structure may be scanned to see if any operation is a hit or otherwise identified as an operation that may be optimized based on the assignment of that operation to a node with more capability to perform that operation than other node(s). In at least some embodiments, a cost-based optimization scheme may be implemented so that query operations may be identified for capability based assignment if the cost estimates for a possible plan for the query that includes the operation are lower than other possible plans.

As indicated at 820, the first node to be assigned to the query operation as part of the plan may be selected according to a difference between the respective capability of the first node to perform the query operation and the respective capabilities of other nodes to perform the query operation. If, for instance, the query operation involves spatial query predicate evaluation, then a node that includes or provides access to a GPU (which may be optimal for performing spatial-based processing) may offer a difference of a hardware optimized result (as opposed other nodes which may not have access to a GPU). Different selection criteria may be determined, in some embodiments. For instance, identification of a query operation and selection of a node may performed for some query operations at runtime, as the feedback or initial performance of previous operations may indicate whether optimization is desirable based on capabilities of the nodes. The plan or query operation may itself include alternative performance instructions depending upon one or more criteria that may be evaluated with respect to the performance of prior operations (e.g., if the data results returned from a scan operation is greater than 500 MB, assign the sort operation to a node according to memory capacity). In some embodiments, different operations may be assigned to the same node based on that node's capabilities. For example, a node that has access to an FPGA may be assigned one query operation to perform (e.g., according to the programming of the FPGA to perform the query operation) and the FPGA may be assigned a second, different query operation (which the FPGA may be reprogrammed to perform after completion of the first operation), in some embodiments.

As indicated at 830, the query may be caused to be performed at the nodes according to the plan, in some embodiments. For example, instructions to perform the query may be generated according to the plan and distributed amongst the nodes. A leader node, coordinator, or other node responsible for generating or performing the plan may send instructions to perform a query operation assigned to a node to the assigned node, in some embodiments.

Figure 9:
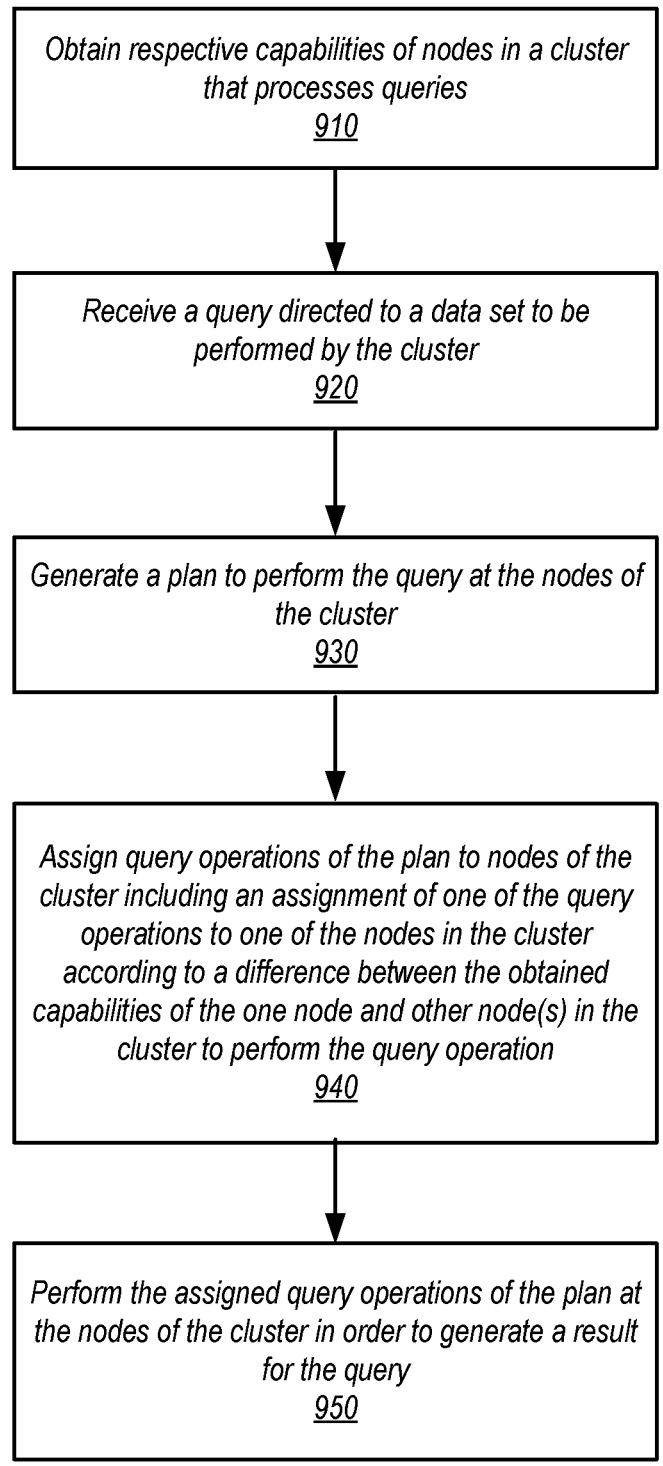
FIG. 9 is a high-level flowchart illustrating various methods and techniques to implement obtaining node capabilities for capability-based query planning for heterogeneous processing nodes, according to some embodiments.

FIG. 9 is a high-level flowchart illustrating various methods and techniques to implement obtaining node capabilities for capability-based query planning for heterogeneous processing nodes, according to some embodiments. As indicated at 910, the respective capabilities of nodes in a cluster that processes queries may be obtained, in some embodiments. Polling, sweeping, or other types of requests that may be sent to each member node of a cluster may include a request for node capabilities. In some embodiments, nodes may automatically report capabilities as part of joining a cluster (e.g., when establishing connections with other nodes, providing other information to implement a distributed processing platform, etc.). Node capabilities may be specified in a format that is understandable to systems or devices implementing capability-based query planning. For example, the capability information may be submitted as human-readable text which may be parsed to identify key words or values that can be specified according to predefined fields (e.g., locations) or identifiers (e.g., tags). In some embodiments, the capabilities of nodes may be identified according to a programmatic interface which may allow a node to specify the different capabilities of the node.

As indicated at 920, a query may be received that is directed to a data set to be performed by the nodes of the cluster, in some embodiments. For example, the query may be received at a leader or coordinator node of the cluster or at a separate query management component, system or service, such as managed query service 270 discussed above with regard to FIGS. 2-7. The query may identify the data set (e.g., by name or other identifier, address or other location, etc.) and may be formatted according to a programmatic interface (e.g., an API) or query language (e.g., SQL), in some embodiments.

As indicated at 930, a plan to perform the query at the cluster may be generated, in some embodiments. For example, the query may be parsed in order to identify the predicates or other criteria for the query, the data set, transformations, modifications, or other operations performed upon retrieved data (e.g., summations, sortations, etc.). The operations to perform the query may include, but are not limited to, read/scan operations, write operations, expression evaluation or other function operations, filter operations, sort operations, aggregate operations, limit operations, and join operations, among others. As indicated at 940, the query operations of the plan may be assigned to the nodes of the cluster, in various embodiments. For example different scan operations may be assigned to different nodes in the cluster to obtain different data (e.g., from the same or different data stores that may store portions of the data set). At least one of the assignments to one node in the cluster may be made according to a difference between the obtained capabilities of the one node and other nodes in the cluster to perform the assigned query operation, in one embodiment. As discussed above with regard to FIG. 8, the node may be identified using lookup tables or other mapping information, cost-based optimizations or other evaluations of a query plan to rearrange or modify query operations, and then assigned by evaluating which node has capabilities that are optimal for the performance of the node (e.g., a larger amount of a resource, the existence of a resource, etc.).

As indicated at 950, the assigned operations of the plan may be performed at the nodes of the cluster in order to generate a result for the query, in various embodiments. For example, instructions to perform the query may be generated according to the plan and distributed amongst the nodes. A leader node, coordinator, or other node responsible for generating or performing the plan may send instructions to perform a query operation assigned to a node to the assigned node, in some embodiments. The results obtained by the performance of the plan may be combined, in some embodiments, and sent back to the client that submitted the query. In other embodiments, such as the managed query service discussed above with regard to FIGS. 2-7, the results may be sent to a different location (e.g., a result store).

Figure 10:
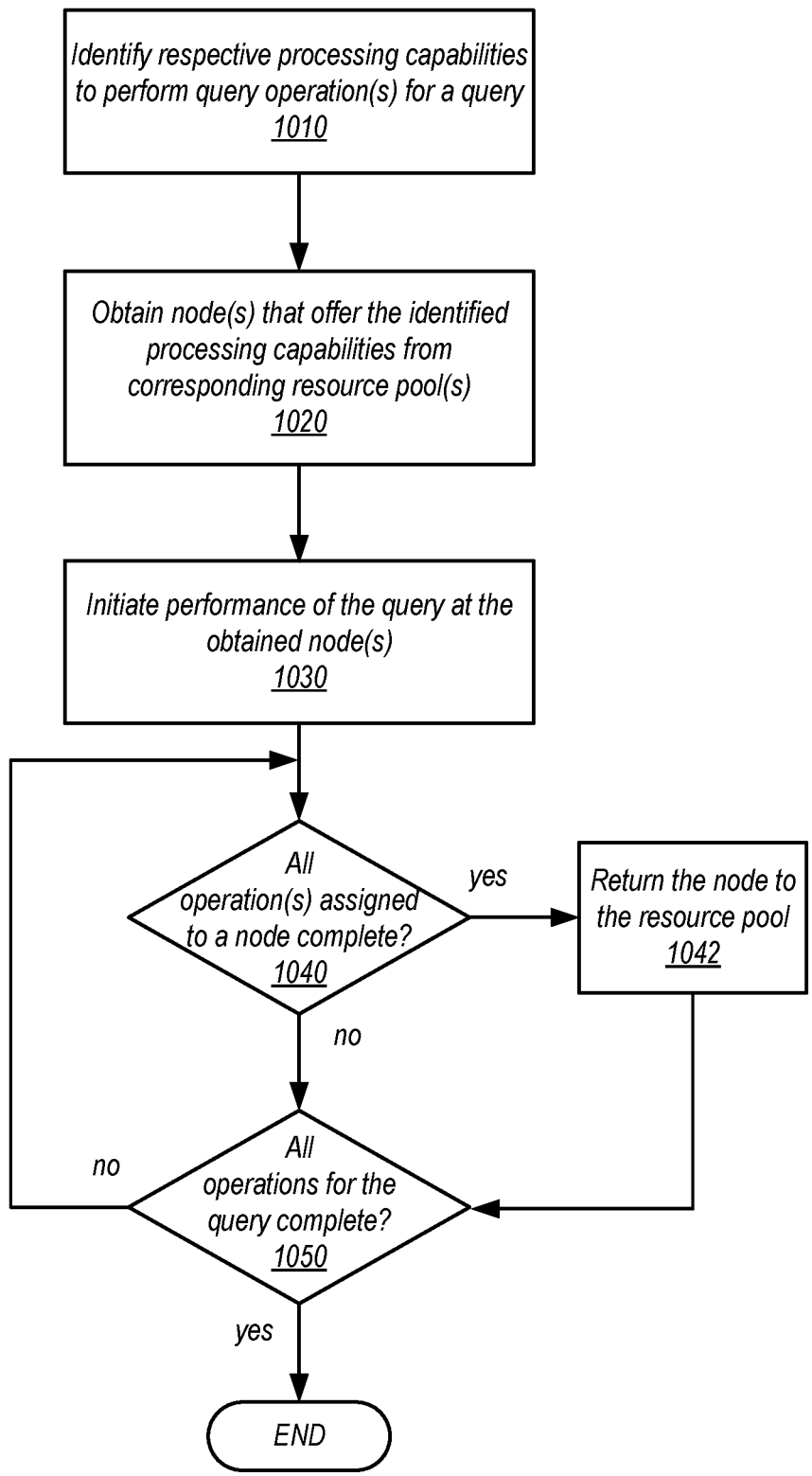
FIG. 10 is a high-level flowchart illustrating various methods and techniques to implement obtaining heterogeneous processing nodes based on processing capabilities for nodes, according to some embodiments.

FIG. 10 is a high-level flowchart illustrating various methods and techniques to implement obtaining heterogeneous processing nodes based on processing capabilities for nodes, according to some embodiments. As indicated at 1010, respective processing capabilities to perform query operation(s) may be identified for a query, in some embodiments. The query may be parsed and evaluated, similar to the plan generation techniques discussed above or may be evaluated according to machine learning or other techniques that can evaluate the query to determine likely processing capabilities (e.g., regular expression capabilities based on text string predicates, etc.) based on the capabilities of nodes that previously performed queries. For example, a heterogeneous classification model for heterogeneous clusters may be generated based on the application of learning algorithm to cluster membership with different capabilities and performance costs, results, outcomes, or other metrics in order to determine a classification function for queries that considers the query (and features thereof) and possible heterogeneous clusters to determine which heterogeneous cluster may be identified for performing a query (e.g., indicating the nodes and/or node types to be obtained).

As indicated at 1020, node(s) that offer the identified processing capabilities may be obtained from corresponding resource pool(s), in some embodiments. As illustrated in FIG. 7, resource pools of pre-configured nodes that offer different processing capabilities, such as specialized hardware devices (ASIC) or FPGA) for performing certain operations, increased memory, storage capacity, I/O bandwidth, network bandwidth, or graphics processing units (GPUs), or different types or versions of software applications. Requests to a provisioning service, resource manager (or individual services that offer such resources like virtual compute service 210 in FIG. 2) may be generated and sent in order to obtain (e.g., provision, lease, etc.) the node(s), in some embodiments.

As indicated at 1030, performance of the query at the obtained node(s) may be initiated, in some embodiments. While the cluster is performing it may be that some of the nodes that offer certain capabilities are in high demand and thus the high demand nodes may be released as soon as the operations assigned to them are completed so that they can be utilized to process another query. For example, as indicated at 1040, an evaluation may be made as to whether all operation(s) assigned to a node are complete. If so, then as indicated at 1042, the node may be returned to the resource pool from which it was obtained. Such evaluations may continue while the query is still being performed, as indicated at 1050, by evaluating whether operations remain for the query to complete.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
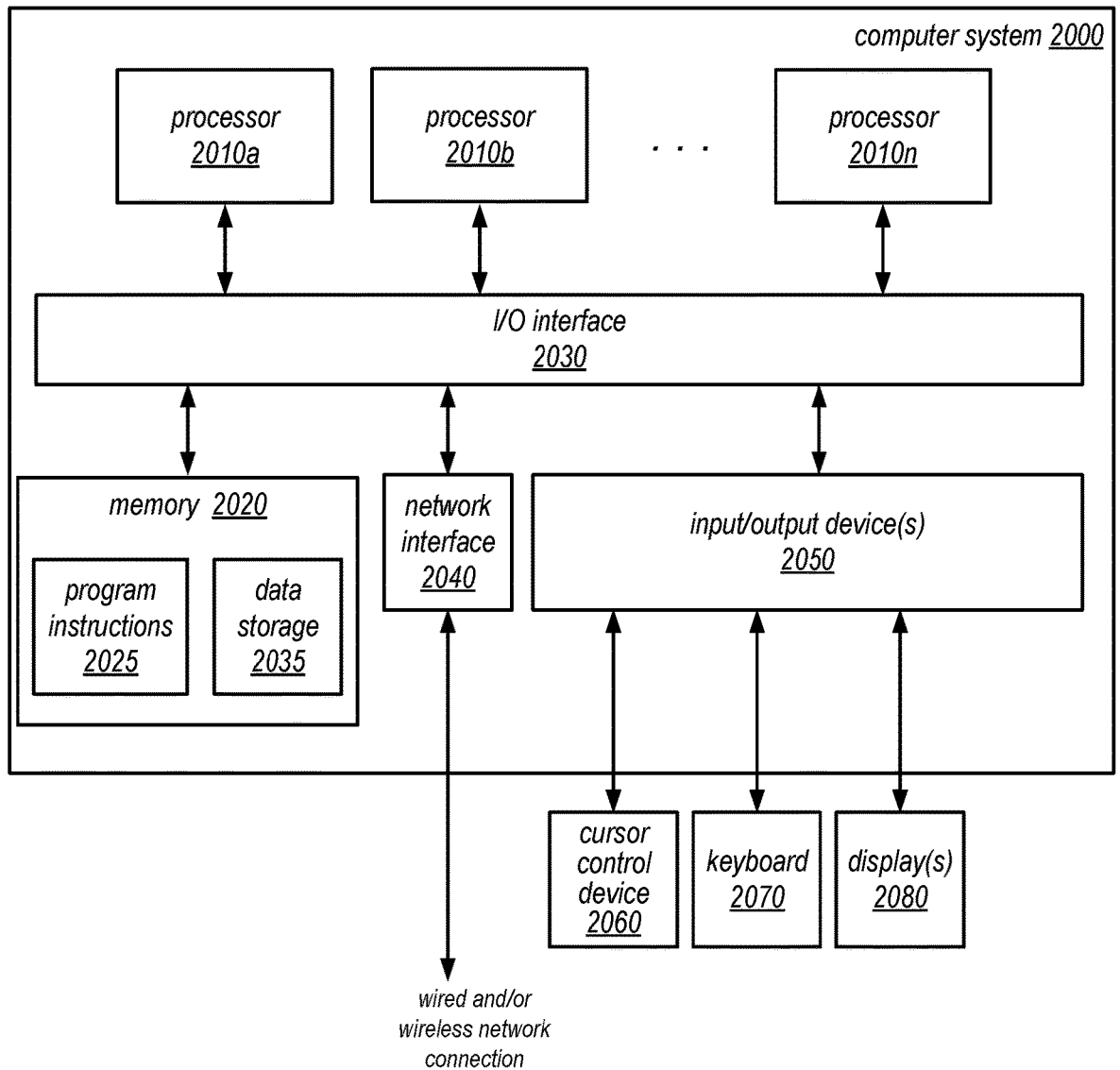
FIG. 11 illustrates an example system configured to implement the various methods, techniques, and systems described herein, according to some embodiments.

Embodiments of capability-based query planning for heterogeneous processing nodes as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a query directed to a data set to be performed by a cluster of nodes;
generate a plan to perform the query at the nodes of the cluster;
assign query operations of the plan to nodes of the cluster including an assignment of one of the query operations to one of the nodes in the cluster having a greater capability to perform the query operation than other nodes in the cluster according to a difference between respective hardware resources of the one node and hardware resources of other nodes in the cluster; and
perform the assigned query operations of the plan at the nodes of the cluster in order to generate a result for the query.

2. The system of claim 1, wherein the method causes the at least one processor to further receive the respective hardware resources of the nodes in the cluster from the nodes in the cluster.

3. The system of claim 1, wherein the method causes the at least one processor to further:
identify respective processing hardware resources to perform one or more query operations in the plan for the query;
obtain at least one of the nodes of the plurality of nodes that offers the identified processing hardware resources from a resource pool of nodes with the identified processing hardware resources, wherein the one node is obtained from the resource pool;
return the one node to the resource pool after the query operation is completed by the one node and before performance of the query is completed.

4. The system of claim 1, wherein the query is received at a managed query service offered as part of a provider network, wherein the nodes of the cluster are obtained from one or more other network-based services of the provider network, and wherein the data set is stored in a storage service of the provider network.

5. A method, comprising:
identifying a query operation in a plan to perform a query directed to a data set at a plurality of nodes for assignment to a first node of the plurality of nodes based, at least in part, on respective hardware resources of the plurality of nodes to perform the query operation;
selecting the first node of the plurality of nodes to be assigned to the query operation as part of the plan, the first node having a greater capability to perform the query operation than others of the plurality of nodes according to a difference between the respective hardware resources of the first node to perform the query operation and the respective hardware resources of other nodes in the plurality of nodes; and
causing the query to be performed at the plurality of nodes according to the plan.

6. The method of claim 5, further comprising obtaining the respective hardware resources of the plurality of nodes.

7. The method of claim 5, wherein the first node has access to a field programmable gate array (FPGA) that is one of the respective hardware resources that implements the query operation.

8. The method of claim 7,
wherein the method further comprises selecting the first node to be assigned another query operation of the plan; and
wherein causing the query to be performed at the plurality of nodes according to the plan comprises causing the FPGA at the first node to be reprogrammed to perform the other query operation after performing the query operation.

9. The method of claim 5, wherein selecting the first node of the plurality of nodes to be assigned to the query operation as part of the plan comprises determining that a result of another query operation in the plan performed prior to the query operation satisfies a criteria that causes performance of the selecting.

10. The method of claim 5, further comprising:
identifying respective processing hardware resources to perform one or more query operations in the plan for the query; and
obtaining at least one of the nodes of the plurality of nodes that offers the identified processing hardware resources from a resource pool of nodes with the identified processing hardware resource.

11. The method of claim 10, wherein identifying the respective processing hardware resources to perform one or more query operations in the plan for the query comprises applying one or more machine learning techniques to processing hardware resources of nodes that previously performed queries.

12. The method of claim 10, wherein the first node is the at least one node obtained from the resource pool, and wherein the method further comprises returning the at least one node to the resource pool after the query operation is completed by the at least one node and before the performance of the query according to the plan is completed.

13. The method of claim 5, further comprising:
receiving the query at one of the nodes in the plurality of nodes from a client; and
returning a result to the client based, at least in part, on the performance of the query at the plurality of nodes according to the plan.

14. A non-transitory, computer-readable storage medium, storing program instructions that when executed by one or more computing devices cause the one or more computing devices to implement:
receiving a query directed to a data set;
identifying a query operation in a plan to perform the query at a plurality of nodes for assignment to a first node of the plurality of nodes based, at least in part, on respective hardware resources of the plurality of nodes to perform the query operation;
selecting the first node of the plurality of nodes to be assigned to the query operation as part of the plan, the first node having a greater capability to perform the query operation than others of the plurality of nodes according to a difference between the respective hardware resources of the first node to perform the query operation and the respective hardware resources of other nodes in the plurality of nodes; and
causing the query to be performed at the plurality of nodes according to the plan.

15. The non-transitory, computer-readable storage medium of claim 14, wherein the first node has access to a graphics processing unit (GPU) that is one of the respective hardware resources that performs the query operation.

16. The non-transitory, computer-readable storage medium of claim 14, wherein, in selecting the first node of the plurality of nodes to be assigned to the query operation as part of the plan, the program instructions cause the one or more computing devices to implement determining that a result of another query operation in the plan performed prior to the query operation satisfies a criteria that causes performance of the selecting.

17. The non-transitory, computer-readable storage medium of claim 14, wherein the program instructions cause the one or more computing devices to further implement:
  identifying respective processing hardware resources to perform one or more query operations in the plan for the query; and
  obtaining at least one of the nodes of the plurality of nodes that offers the identified processing hardware resources from a resource pool of nodes with the identified processing hardware resources.

18. The non-transitory, computer-readable storage medium of claim 14, wherein the program instructions cause the one or more computing devices to further implement obtaining the plurality of nodes to perform the query in response to receiving the query.

19. The non-transitory, computer-readable storage medium of claim 14, wherein the program instructions cause the one or more computing devices to further implement obtaining the respective hardware resources of the plurality of nodes.

20. The non-transitory, computer-readable storage medium of claim 14, wherein the query is received at a managed query service offered as part of a provider network, wherein the nodes of the cluster are obtained from one or more other network-based services of the provider network, and wherein the data set is stored in a storage service of the provider network.

* * * * *